(12) United States Patent
Chen et al.

(10) Patent No.: US 10,776,558 B2
(45) Date of Patent: Sep. 15, 2020

(54) TESTING SYSTEM AND TESTING METHOD

(71) Applicant: Global Unichip (Nanjing) Ltd., Jiangsu Province (CN)

(72) Inventors: Shih-Hsin Chen, Jiangsu Province (CN); Te-Hsun Fu, Taipei (TW); Ming-Tung Chang, Jiangsu Province (CN)

(73) Assignee: Global Unichip (Nanjing) Ltd., Nanjing, Jiangsu Province (CN)

( * ) Notice: Subject to any disclaimer, the term of this patent is extended or adjusted under 35 U.S.C. 154(b) by 0 days.

(21) Appl. No.: 16/360,007

(22) Filed: Mar. 21, 2019

(65) Prior Publication Data

US 2020/0151299 A1 May 14, 2020

(30) Foreign Application Priority Data

Nov. 13, 2018 (CN) .......................... 2018 1 1344803

(51) Int. Cl.
| | | |
|---|---|---|
| G06F 30/30 | (2020.01) | |
| G06F 30/398 | (2020.01) | |
| G06F 30/327 | (2020.01) | |
| G06F 30/392 | (2020.01) | |
| G06F 30/394 | (2020.01) | |
| G06F 30/3312 | (2020.01) | |
| G06F 119/12 | (2020.01) | |

(52) U.S. Cl.
CPC .......... *G06F 30/398* (2020.01); *G06F 30/327* (2020.01); *G06F 30/3312* (2020.01); *G06F 30/392* (2020.01); *G06F 30/394* (2020.01); *G06F 2119/12* (2020.01)

(58) Field of Classification Search
CPC .. G06F 30/392; G06F 30/3312; G06F 30/394; G06F 30/398; G06F 30/327
USPC .......................................... 716/110, 111, 113
See application file for complete search history.

(56) References Cited

U.S. PATENT DOCUMENTS

| | | | | |
|---|---|---|---|---|
| 6,763,513 | B1* | 7/2004 | Chang et al. ......... | G06F 30/327 716/114 |
| 6,966,022 | B1* | 11/2005 | Stenfort et al. .............................. | G01R 31/318541 327/141 |
| 7,358,786 | B2* | 4/2008 | Kim ............... | G01R 31/318552 327/202 |
| 7,472,363 | B1* | 12/2008 | Chandra ............... | G06F 30/398 716/106 |
| 7,930,673 | B2* | 4/2011 | Jiang et al. ........... | G06F 30/327 716/132 |
| 8,522,188 | B2* | 8/2013 | Kim et al. .......... | H01L 27/0207 716/134 |
| 9,135,375 | B1* | 9/2015 | Sood et al. ............. | G06F 30/00 |
| 10,140,412 | B2* | 11/2018 | Lee et al. ............... | G06F 30/398 |
| 2006/0217916 | A1* | 9/2006 | Cheng et al. ......... | G06F 30/398 702/119 |

(Continued)

FOREIGN PATENT DOCUMENTS

TW          200925919 A       6/2009

*Primary Examiner* — Sun J Lin
(74) *Attorney, Agent, or Firm* — CKC & Partners Co., LLC (57) ABSTRACT

A testing method includes the following operations: performing a place and route procedure according to a netlist file corresponding to a chip to generate first layout data; determining whether to replace a flip-flop circuit in the chip with a gated flip-flop circuit according to the first layout data to generate second layout data; and running a test on the chip according to the second layout data.

10 Claims, 10 Drawing Sheets

(56) References Cited

U.S. PATENT DOCUMENTS

2016/0117435 A1* 4/2016 Lee et al. ................ G06F 30/39
716/112

* cited by examiner

TESTING SYSTEM AND TESTING METHOD

CROSS-REFERENCE TO RELATED APPLICATION

This application claims priority to China Application Serial Number 201811344803.3, filed Nov. 13, 2018, which is herein incorporated by reference in its entirety.

BACKGROUND

Technical Field

The present disclosure relates to a testing system and a testing method. More particularly, the present disclosure relates to a testing system and a testing method applicable to integrated circuit testing and able to reduce a voltage drop in an integrated circuit.

Description of Related Art

In the field of integrated circuit testing, a specific test circuit can be arranged to run subsequent debugging or bug detecting test. However, as the number of circuit components increases, the number of test circuits also increases. In addition, in order to prevent from causing the excessive transient current during the testing, an additional gated logic is added to the test circuit. For both of the above reasons, the chip area will be significantly increased and unnecessary extra delay may be introduced.

SUMMARY

Some aspects of the present disclosure are to provide a testing system that includes a memory and a processor. The memory is configured to store a plurality of computer codes. The processor is configured to execute the computer codes in the memory in order to execute the following operations: performing a place and route procedure according to a netlist file corresponding to a chip in order to generate first layout data; determining whether to replace a flip-flop circuit in the chip with a gated flip-flop circuit according to the first layout data in order to generate second layout data; and running a test on the chip according to the second layout data.

Some other aspects of the present disclosure are to provide a testing method that includes the following operations: performing a place and route procedure according to a netlist file corresponding to a chip in order to generate first layout data; determining whether to replace a flip-flop circuit in the chip with an gated flip-flop circuit according to the first layout data in order to generate second layout data; and running a test on the chip according to the second layout data.

As described above, the testing system, testing method, and gated flip-flop circuit provided in some embodiments of the present disclosure can exchange components at the design stage through compatible input and output interfaces. As a result, more chip area and unnecessary power consumption can be saved, and a more accurate timing analysis is obtained.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

All terms used herein have their ordinary meanings. The above terms are defined in the commonly used dictionaries, and any examples of the use of the term discussed herein included in the description of the present specification are merely for illustrative purposes, and are not intended to limit the scope and meaning of the present disclosure. Similarly, the present disclosure is not limited to the various embodiments described in this specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure. It will be understood that, as used herein, the phrase "and/or" includes any and all combinations of one or more of the associated listed items.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other.

In this document, the term "circuitry" may indicate a system formed with one or more circuits. The term "circuit" may indicate an object, which is formed with one or more transistors and/or one or more active/passive elements based on a specific arrangement, for processing signals.

Figure 1:
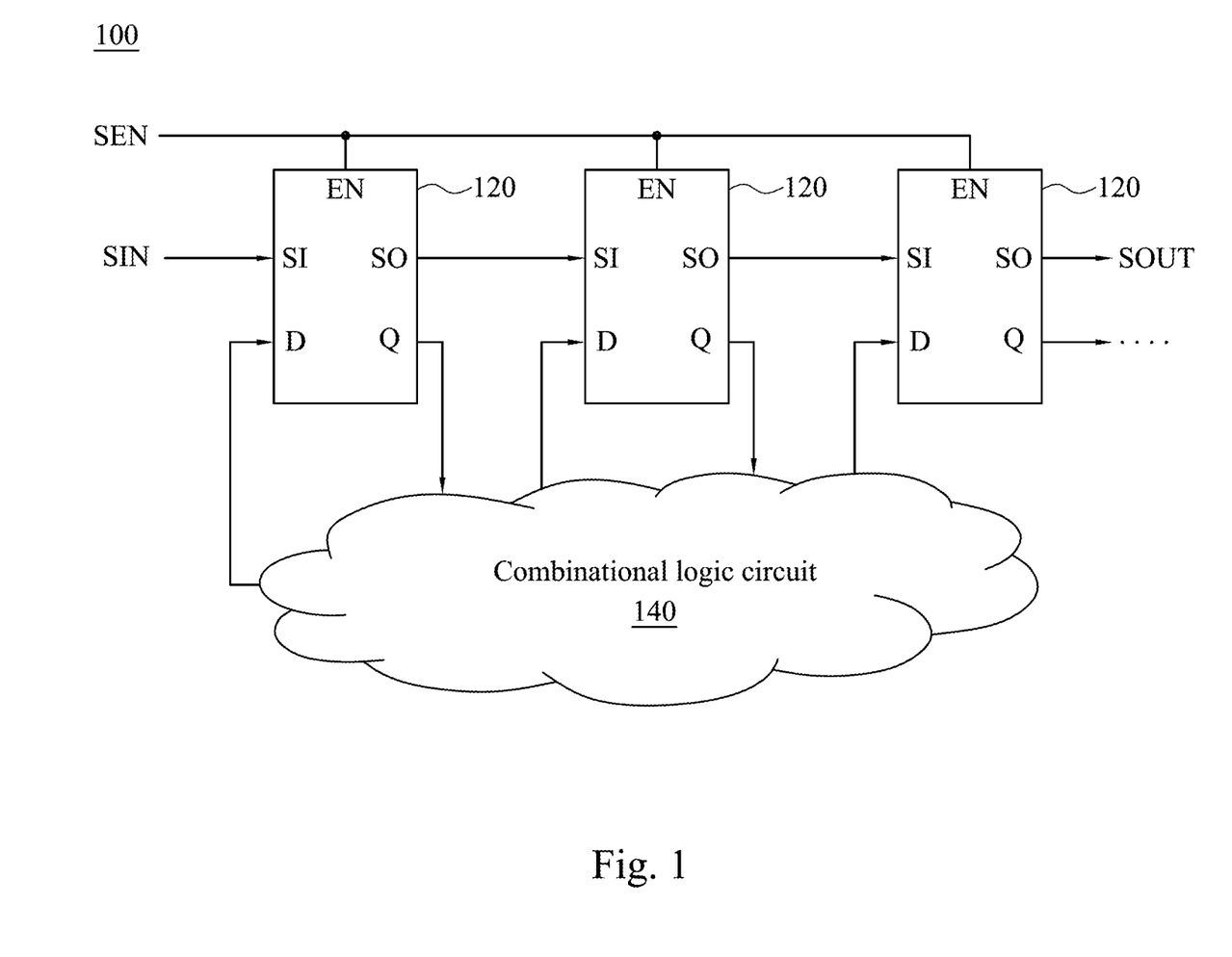
FIG. 1 is a schematic diagram of a scan chain circuitry according to some embodiments of the present disclosure.

Reference is now made to FIG. 1. FIG. 1 is a schematic diagram of a scan chain circuitry 100 according to some embodiments of the present disclosure. In some embodiments, the scan chain circuitry 100 may be implemented in an integrated circuit (or a chip) to facilitate subsequent testing (such as a timing analysis, etc.).

The scan chain circuitry 100 comprises a plurality of flip-flop circuits 120 connected in series and a combinational logic circuit 140. In some embodiments, the flip-flop circuit 120 may be a D-type flip-flop, but the present disclosure is not limited thereto. Various types of flip-flop circuits 120 are within the contemplated scope of the present disclosure. In some embodiments, the combinational logic circuit 140 may be a group of one or more digital (or logic) circuits to be tested.

Each of the flip-flop circuits 120 comprises a first input terminal SI, a second input terminal D, an enable terminal EN, a first output terminal SO, and a second output terminal Q. The enable terminal EN of each of the flip-flop circuits 120 is configured to receive a scan enable signal SEN. The first input terminal SI of a first flip-flop circuit 120 is configured to receive a scan input signal SIN, and the first output terminal SO of the first flip-flop circuit 120 is coupled to the first input terminal SI of a second first flip-flop circuit 120. By analogy, the first output terminal SO of a last flip-flop circuit 120 is configured to output a scan output signal SOUT.

In addition, the second input terminal D and the second output terminal Q of each of the flip-flop circuits 120 are respectively coupled to an input/output node in the combinational logic circuit 140 correspondingly to receive/output a primary input/output signal (not shown in the figure). When the scan enable signal SEN having a specific logic value (such as, a logic value of 0) is received, the plurality of flip-flop circuits 120 are enabled to enter a scan mode. In the scan mode, an operation of each of the plurality of flip-flop circuits 120 is similar to a shift register, and the scan output signal SOUT is generated according to the scan input signal SIN. Equivalently, when operating in the scan mode, each of the flip-flop circuits 120 latches a signal received by its first input terminal SI and outputs the signal via the first output terminal SO. In other words, the scan output signal SOUT is determined by the scan input signal SIN in the scan mode without being affected by the combinational logic circuit 140. Therefore, in the subsequent test operations after the scan mode, whether the combinational logic circuit 140 is defective or malfunctions can be determined by detecting a change of a signal value of the scan output signal SOUT.

Figure 2:
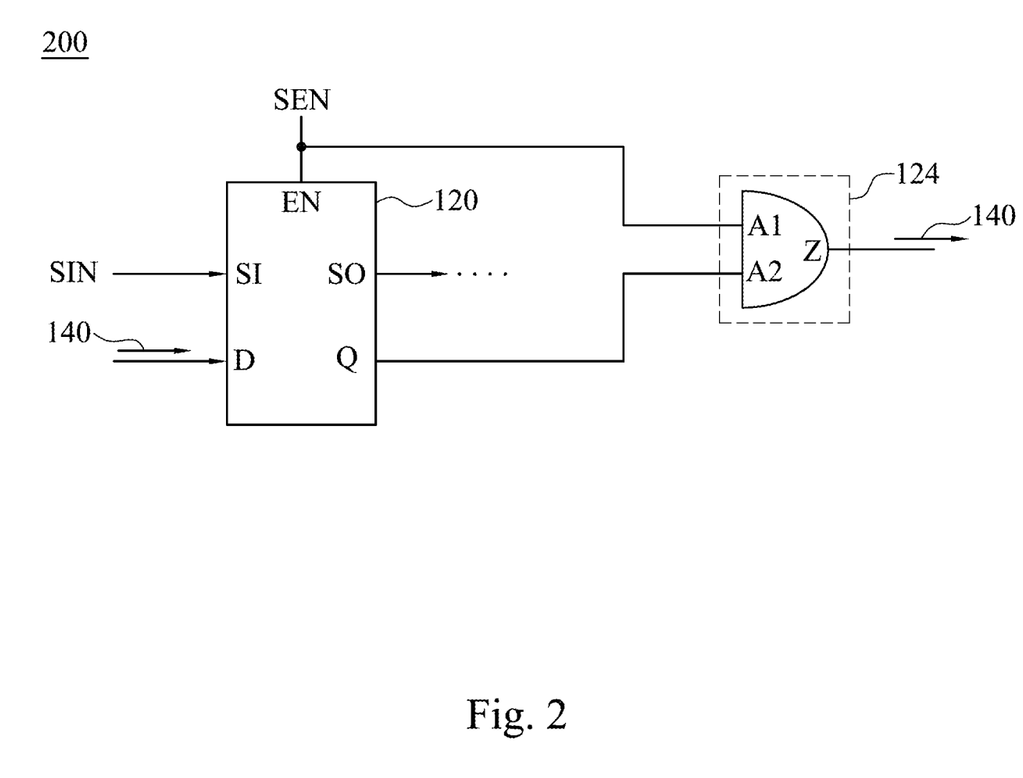
FIG. 2 is a schematic diagram of a gated flip-flop circuit according to some embodiments of the present disclosure.

Reference is now made to FIG. 2. FIG. 2 is a schematic diagram of a gated flip-flop circuit 200 according to some embodiments of the present disclosure. For ease of understanding, likes elements in FIG. 2 are designated with the same reference numbers with respect to FIG. 1.

As mentioned above, when operating at the scan mode, the combinational logic circuit 140 does not affect the scan output signal SOUT. Hence, switching of the combinational logic circuit 140 in the scan mode will cause unnecessary power consumption, and may introduce an excessive transient current, resulting in a voltage drop in the circuit. In some embodiments, each of the flip-flop circuits 120 in FIG. 1 may be further equipped with a gated circuit 124. In some embodiments, the gated circuit 124 can cooperate with the flip-flop circuit 120 of FIG. 1, in order to operate as a gated flip-flop circuit 200 to prevent the combinational logic circuit 140 from switching in the scan mode. As a result, the above unnecessary power consumption and voltage drop can be reduced. In different embodiments, the gated circuit 124 may be implemented with a logic circuit such as an AND gate, a NOR gate, or a multiplexer, etc., but the present disclosure is not limited thereto. Various types of gated circuit 124 are within the contemplated scope of the present disclosure. For ease of understanding, the AND gate is given for illustrative purposes in the following paragraphs.

In this example, the gated circuit 124 includes a first input terminal A1, a second input terminal A2, and an output terminal Z. The first input terminal A1 is coupled to the enable terminal EN of the flip-flop circuit 120, so as to receive the scan enable signal SEN. The second input terminal A2 is coupled to the second output terminal Q of the flip-flop circuit 120, and the output terminal Z is coupled to an internal node of the combinational logic circuit 140. In other words, the gated circuit 124 is coupled between the combinational logic circuit 140 and the flip-flop circuit 120. Equivalently, the output terminal Z of the gated flip-flop circuit 200 replaces the second output terminal Q of the flip-flop circuit 120 to be connected to the combinational logic circuit 140. As mentioned previously, the scan enable signal SEN has the specific logic value (such as, the logic value of 0) when entering the scan mode. Under this condition, a signal output from the output terminal Z of the gated circuit 124 will be maintained at a fixed potential (for example, a potential corresponding to the logic value of 0), in order to not change the switching of the combinational logic circuit 140. In this manner, the operation of the combinational logic circuit 140 in the scan mode, which generates unnecessary power consumption, can be avoided.

Figure 3A:
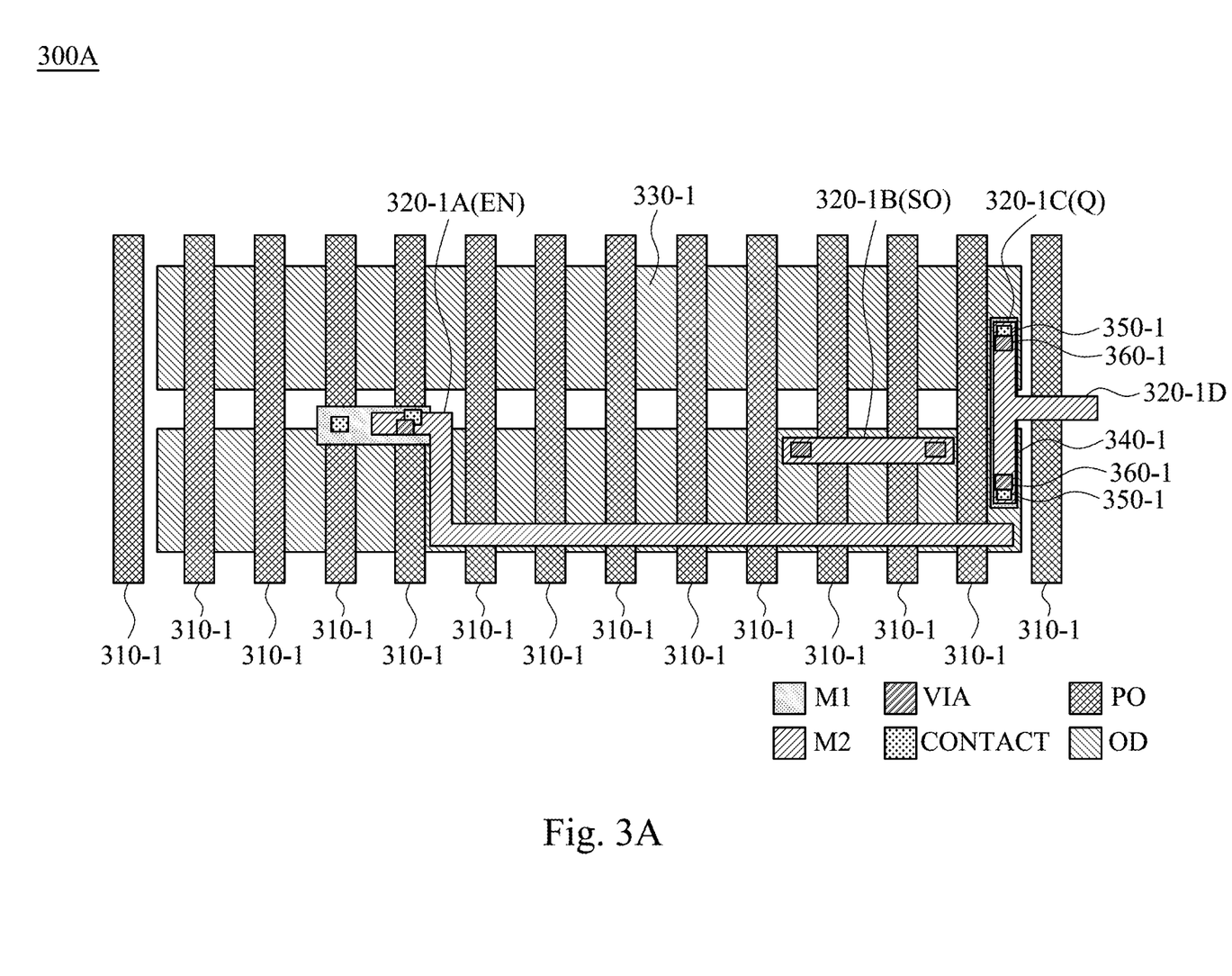
FIG. 3A is a schematic diagram of a circuit layout corresponding to the flip-flop circuit in FIG. 1 according to some embodiments of the present disclosure.
Figure 3B:
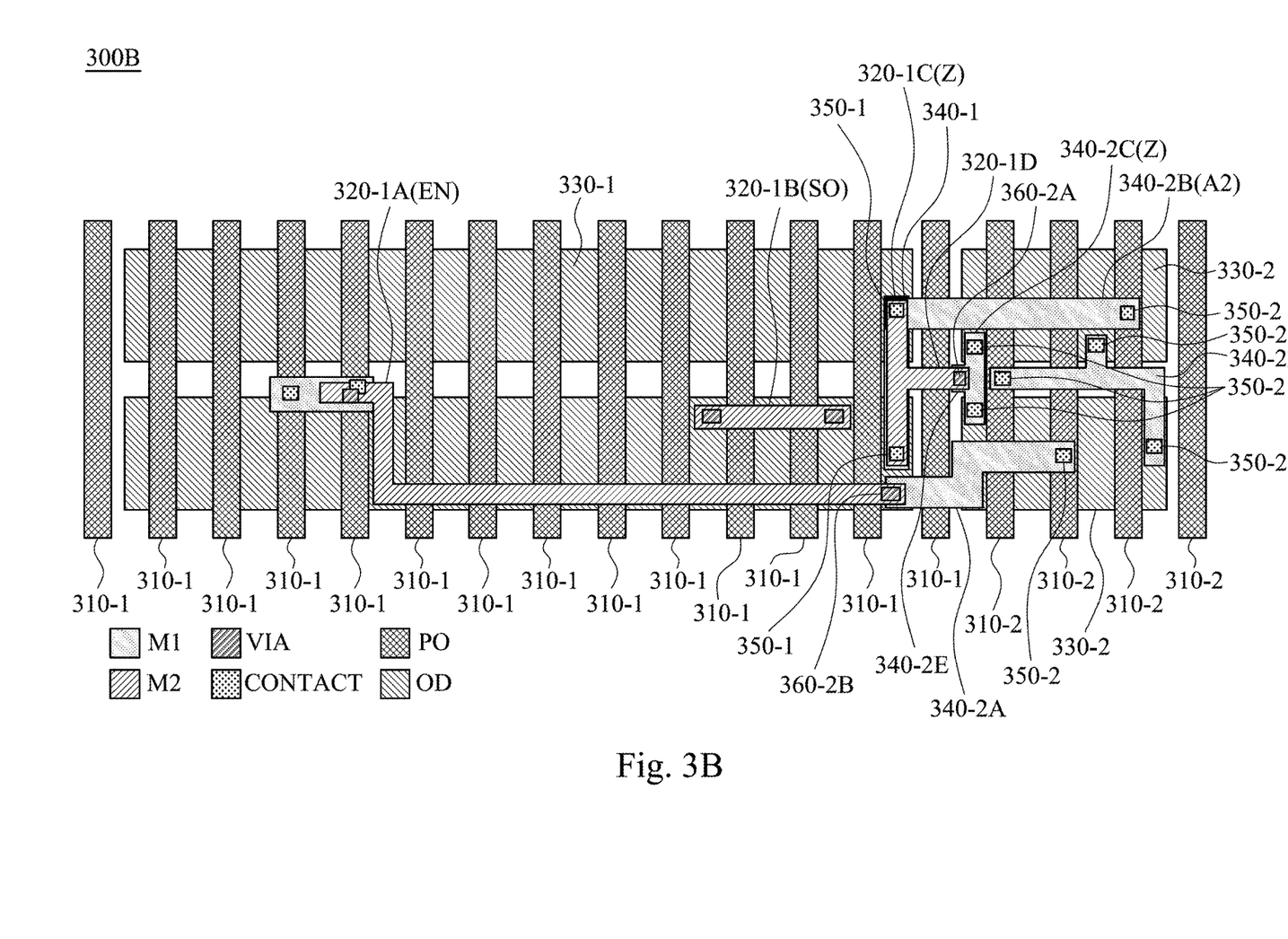
FIG. 3B is a schematic diagram of a circuit layout corresponding to the gated flip-flop circuit in FIG. 2 according to some embodiments of the present disclosure.
Figure 4A:
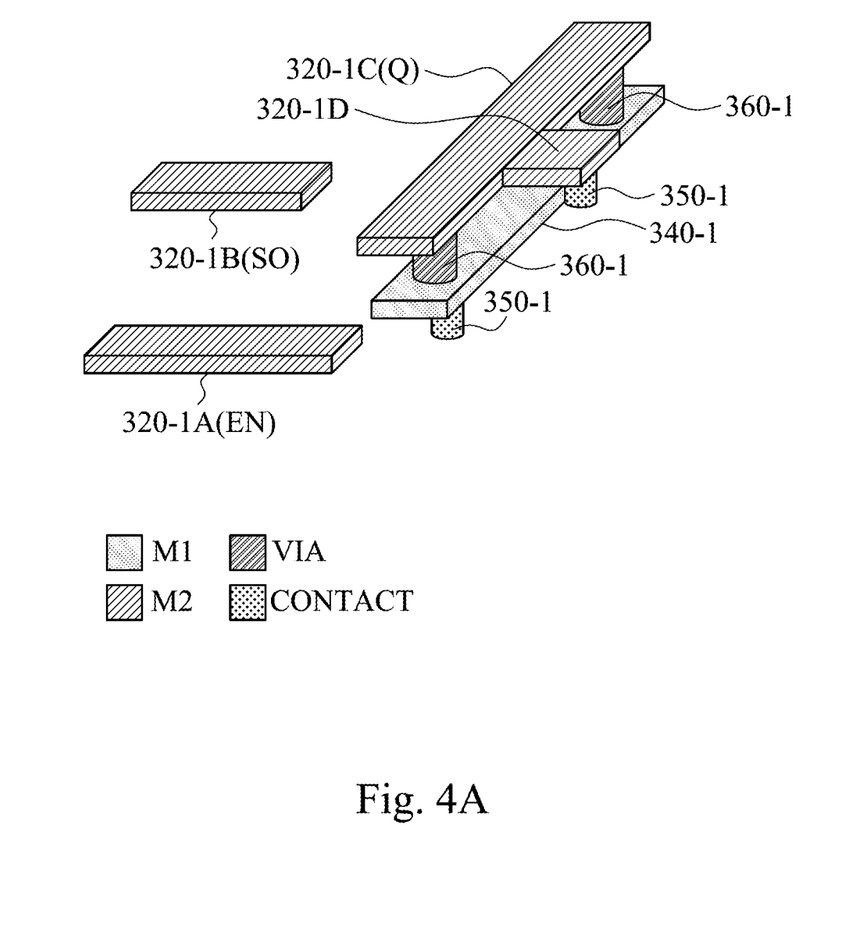
FIG. 4A is a schematic perspective view corresponding to the rightmost portion of the circuit layout in FIG. 3A according to some embodiments of the present disclosure.
Figure 4B:
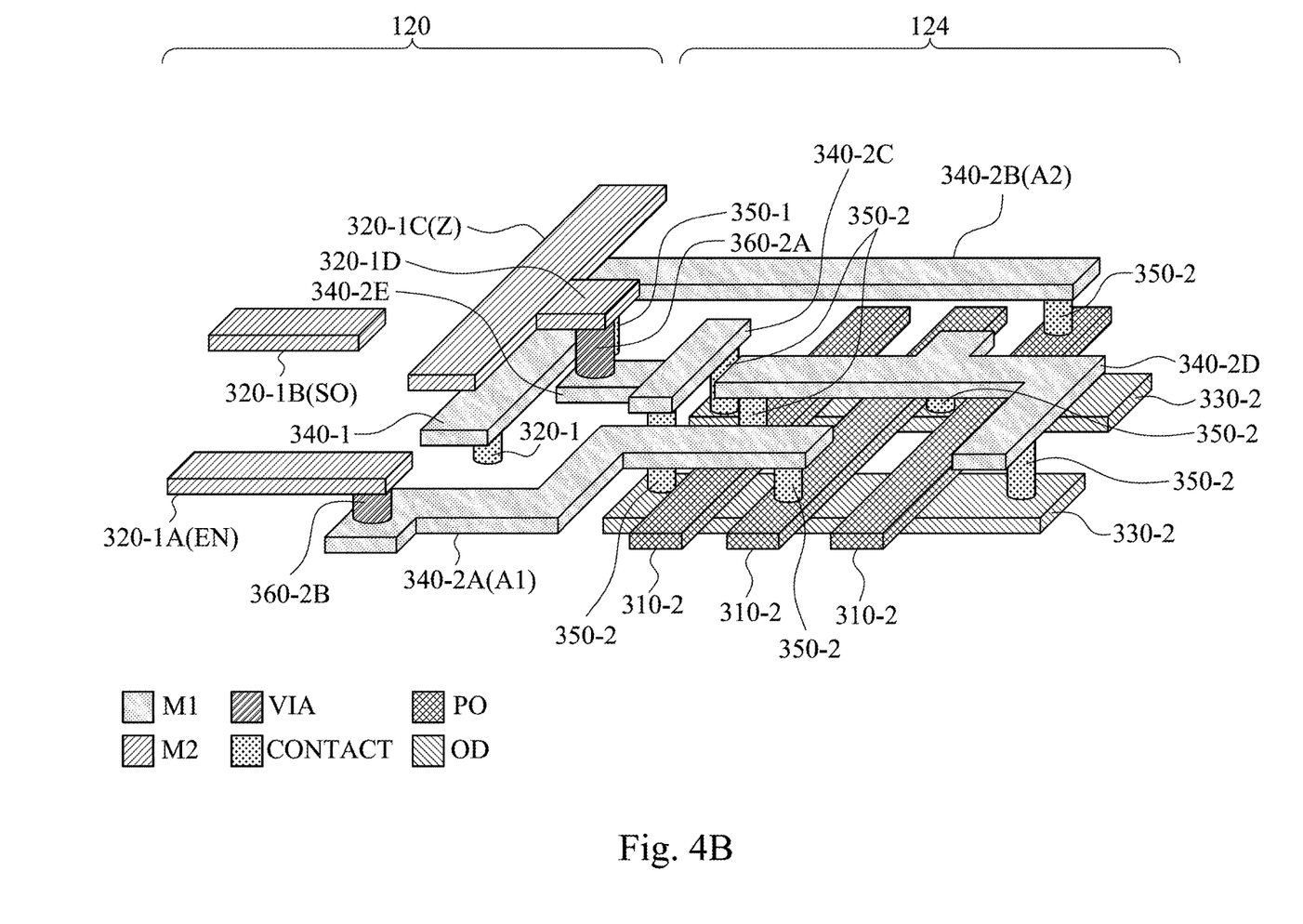
FIG. 4B is a schematic perspective view corresponding to the rightmost portion of the circuit layout in FIG. 3B according to some embodiments of the present disclosure.

Reference is now made to FIG. 3A to FIG. 3B and FIG. 4A to FIG. 4B. FIG. 3A is a schematic diagram of a circuit layout 300A corresponding to the flip-flop circuit 120 in FIG. 1 according to some embodiments of the present disclosure. FIG. 3B is a schematic diagram of a circuit layout 300B corresponding to the gated flip-flop circuit 200 in FIG. 2 according to some embodiments of the present disclosure. FIG. 4A is a schematic perspective view corresponding to the rightmost portion of the circuit layout 300A in FIG. 3A according to some embodiments of the present disclosure. FIG. 4B is a schematic perspective view corresponding to the rightmost portion of the circuit layout 300B in FIG. 3B according to some embodiments of the present disclosure. For ease of understanding, like elements in FIG. 3A to FIG. 3B and FIG. 4A to FIG. 4B are designated with the same reference numbers with respect to FIG. 1 to FIG. 2.

In some embodiments, the circuit layout 300A corresponds to a first arrangement of the flip-flop circuit 120 in FIG. 1, and the circuit layout 300B corresponds to a second arrangement of the gated flip-flop circuit 200 in FIG. 2. FIG. 3A to FIG. 3B and FIG. 4A to FIG. 4B are given for illustrative purposes, in order to describe the related arrangements. It should be understood that, in order to clearly understand the related arrangements, the locations of main input/output terminals are shown in FIG. 3A to FIG. 3B and FIG. 4A to FIG. 4B, but details such as all interconnect layers, semiconductor layers, or entire structures related to internal transistors, etc. are not shown in detail. The arrangements shown in FIG. 3A to FIG. 3B and FIG. 4A to FIG. 4B can be adjusted, replaced, and changed depending on process requirements and/or design specifications without departing from the spirit and scope of the present disclosure.

In some embodiments, the gated flip-flop circuit 200 and the flip-flop circuit 120 are configured to have compatible input and output interfaces (for example, the first output terminal SO, the enable terminal EN, and the output terminal Z (or the second output terminal Q), etc.). For example, as shown in FIG. 3A, the circuit layout 300A includes patterns 310-1, patterns 320-1A to 320-1D, patterns 330-1, a pattern 340-1, patterns 350-1, and patterns 360-1 when being applied to the flip-flop circuit 120. The patterns 310-1 correspond to gates of transistors for implementing the flip-flop circuit 120, and may be implemented with a polysilicon layer PO. The patterns 320-1A to 320-1D correspond to input terminals or output terminals of the flip-flop circuit 120, and may be implemented with a second metal layer M2. For example, the pattern 320-1A corresponds to the enable terminal EN. The pattern 320-1B corresponds to the first output terminal SO. The pattern 320-1C corresponds to the second output terminal Q, and the pattern 320-1D is used to extend the pattern 320-1C. The patterns 330-1 are used to define active areas corresponding to the above plurality of transistors, and may be implemented with an oxide diffusion (OD) layer.

The pattern 340-1 may be implemented with a first metal layer M1 for use as an interconnect layer of the flip-flop circuit 120. It should be understood that, in some embodiments, a detailed structure of each of the above patterns implemented with the first metal layer M1 or the second metal layer M2 can be considered as a conductive segment. For example, reference is also made to FIG. 4A, and the pattern 340-1 is disposed corresponding to internal nodes (not shown in the figure) of the flip-flop circuit 120, in order to connect the second output terminal Q.

Additionally, the patterns 350-1 may be implemented with contacts and are used for electrically connecting the metal layer and the polysilicon layer or the active areas. A description is provided with reference to FIG. 4A, for example, the plurality of patterns 350-1 are disposed respectively corresponding to two ends of the above pattern 340-1 to couple the first metal layer M1 corresponding to the pattern 340-1 to the internal nodes of the flip-flop circuit 120.

The patterns 360-1 may be implemented with vias which are used for electrically connecting the metal layers. Referring to FIG. 4A, one pattern 360-1 is disposed at each end of the pattern 320-1C. In this manner, the second metal layer M2 corresponding to the pattern 320-1C can be coupled to the first metal layer M1 corresponding to the lower pattern 340-1 through the vias corresponding to the patterns 360-1, in order to operate as the second output terminal Q.

As shown in FIG. 3B, compared with the circuit layout 300A, when being applied to the gated flip-flop circuit 200, the circuit layout 300B further includes patterns 310-2, patterns 330-2, patterns 340-2A to 340-2E, patterns 350-2, and patterns 360-2A to 360-2B.

The patterns 310-2 correspond to gates of transistors of the gated circuit 124, and may be implemented with the polysilicon layer PO. The patterns 330-2 are used to define active areas corresponding to the above transistors, and may be implemented with the oxide diffusion layer OD. The patterns 340-2A to 340-2E correspond to a input terminals or output terminals of the gated circuit 124 and its interconnect layer, and may be implemented with the first metal layer M1. For example, the pattern 340-2A corresponds to the first input terminal A1. The pattern 340-2B corresponds to the second input terminal A2. The pattern 340-2C corresponds to the output terminal Z. The pattern 340-2D corresponds to the interconnect layer to implement interconnection of the gated circuit 124, and the pattern 340-2E is used to extend the pattern 340-2C.

The patterns 350-2 may be implemented with contacts and are used for electrically connecting the first metal layer M1 to the gates (that is, locations corresponding to the polysilicon layer PO) or sources/drains (that is, locations corresponding to the oxide diffusion layer OD). For example, the plurality of patterns 350-2 are disposed respectively corresponding to end points of the above patterns 340-2A to 340-2D to couple the first metal layer M1 corresponding to the patterns 340-2A to 340-2D to internal nodes of the gated circuit 124 (gates or sources/drains).

The patterns 360-2A and 360-2B may be implemented with vias and are used for electrically connecting the metal layers. A description is provided with reference to FIG. 4B, for example, the vias corresponding to the patterns 360-1 are removed as compared with FIG. 4A. Hence, the second metal layer M2 corresponding to the pattern 320-1C is not connected to the first metal layer M1 corresponding to the lower pattern 340-1. The pattern 360-2A is disposed between the pattern 340-2E and the pattern 320-1D, and the pattern 360-2B is disposed between the pattern 340-2A and the pattern 320-1A. In this manner, the first metal layer M1 corresponding to the pattern 340-2E can be coupled to the second metal layer M2 corresponding to the pattern 320-1D through the via corresponding to the pattern 360-2A. With this arrangement, the output terminal corresponding to the pattern 320-1C can be compatible with the output terminal Q of the flip-flop circuit 120 or the output terminal Z of the gated flip-flop circuit 200. In addition to that, the first metal layer M1 corresponding to the pattern 340-2A can be coupled to the second metal layer M2 corresponding to the pattern 320-1A through the via corresponding to the pattern 360-2B. Equivalently, as shown in FIG. 2 previously, the first input terminal A1 may be coupled to the enable terminal EN of the flip-flop circuit 120.

Based on the arrangements of FIG. 4A to FIG. 4B, it can be found that, in the circuit layouts 300A and 300B that correspond to the first arrangement and the second arrangement respectively, the location of the input terminals or output terminals defined by each of the patterns 320-1A to 320-1D corresponding to the second metal layer M2 are the same. Therefore, these input terminals or output terminals can be compatible with the flip-flop circuit 120 and the gated flip-flop circuit 200. As a result, in some embodiments, the flip-flop circuit 120 and the gated flip-flop circuit 200 can be directly replaced with each other when performing a testing method (such as the method 600 described later).

Figure 5:
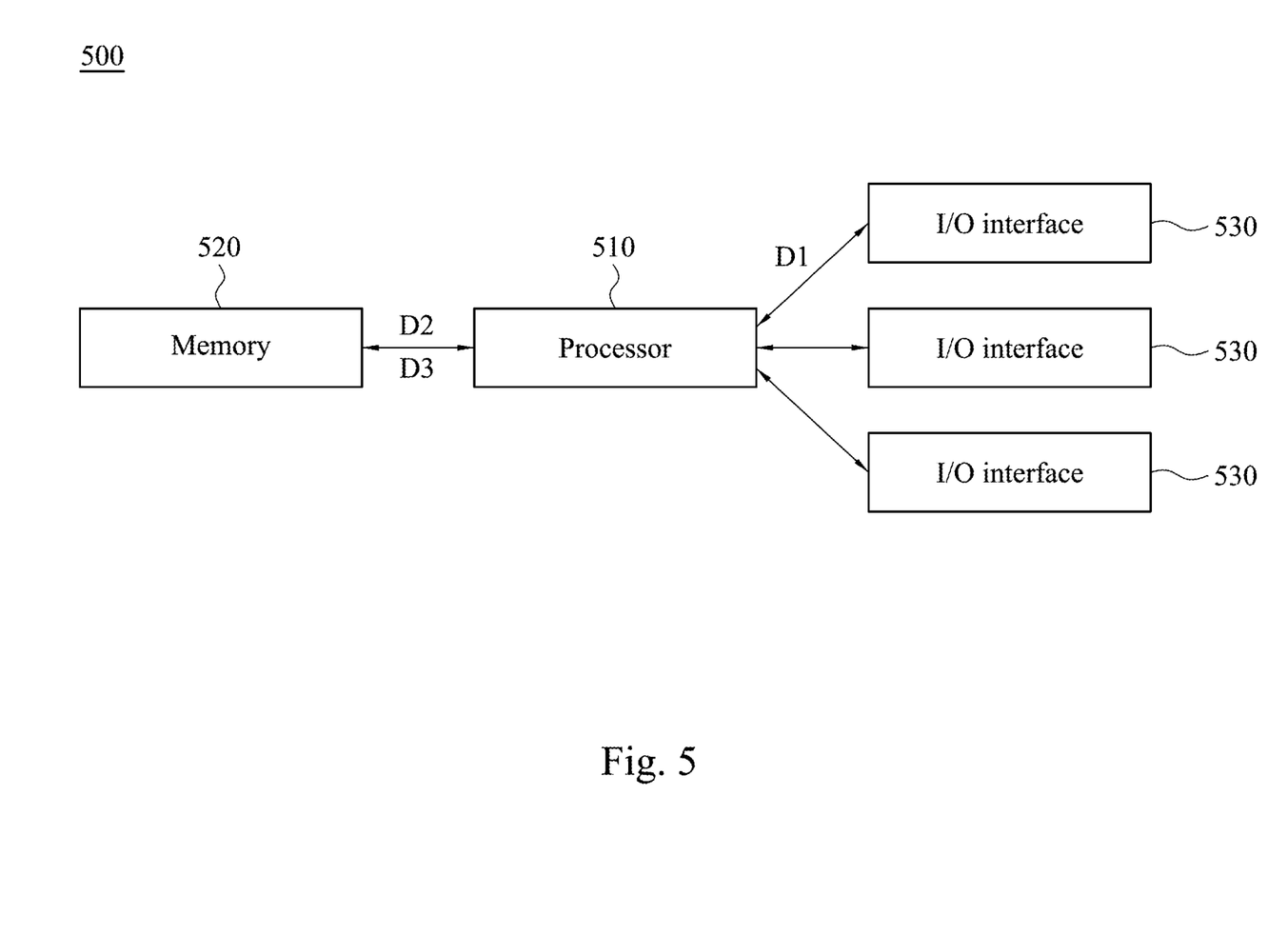
FIG. 5 is a schematic diagram of a testing system according to some embodiments of the present disclosure.
Figure 6:
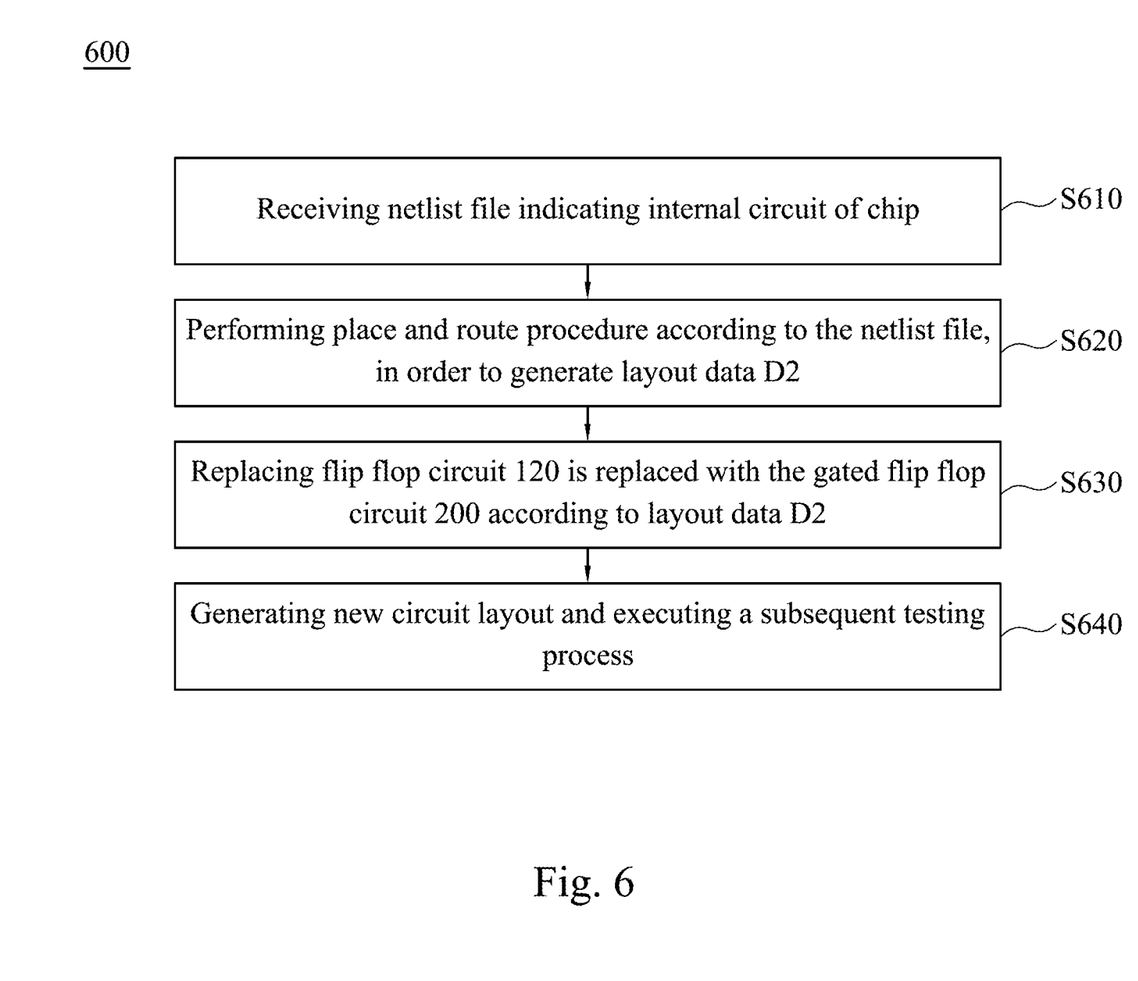
FIG. 6 is a flow chart of a testing method according to some embodiments of the present disclosure.

Reference is now made to FIG. 5 and FIG. 6. FIG. 5 is a schematic diagram of a testing system 500 according to some embodiments of the present disclosure, and FIG. 6 is a flow chart of a testing method 600 according some embodiments of the present disclosure. For ease of understanding, the testing method 600 is described with reference to operations of the testing system 500.

The testing system 500 includes a processor 510, a memory 520, and input/output (I/O) interfaces 530. The processor 510 is coupled to the memory 520 and the plurality of I/O interfaces 530. In various embodiments, the processor 510 is a central processing unit (CPU), an application-specific integrated circuit (ASIC), a multiprocessor, a distributed processing system, or a suitable processing unit. Various circuits or units used for implementing the processor 510 are within the contemplated scope of the present disclosure.

The memory 520 stores one or more codes for assisting in designing an integrated circuit. For illustrative purposes, the memory 520 stores one program code, and the program code is encoded by a plurality of instruction sets. The plurality of instruction sets are used to check a plurality of layout patterns in a plurality of integrated circuits, or run a test on the integrated circuits. In some embodiments, the processor 510 can execute the code stored in the memory 520, and operations of the testing method 600 thus are able to be automatically executed.

In some embodiments, the memory 520 is a non-transitory computer readable storage medium having (that is, storing) encoding of the plurality of instruction sets for testing a chip. For illustrative purposes, the memory 520 stores a plurality of executable instructions that are configured to execute the testing method 600. In some embodiments, the computer readable storage medium is an electrical, magnetic, optical, infrared and/or semiconductor system (or apparatus or device). For example, the computer readable storage medium includes a semiconductor or solid state memory, a magnetic tape, a removable computer diskette, a random access memory (RAM), a read only memory (ROM), a hard disk and/or an optical disc. In one or more embodiments where the optical disc is used, the computer readable storage medium includes a compact disc read-only memory (CD-ROM), a compact disc re-writable (CD-R/W), and/or a digital versatile disc (DVD).

The I/O interfaces 530 receive a plurality of inputs or commands from various control devices. The control devices can be manipulated by a circuit designer or a test engineer. Accordingly, the testing system 500 can be manipulated by the inputs or commands of the plurality of I/O interfaces 530. In some embodiments, the I/O interfaces 530 include a screen for displaying the status of code execution and/or for displaying circuit layout. In some embodiments, the I/O interfaces 530 include a graphical user interface (GUI). In some other embodiments, the I/O interfaces 530 include a keyboard, a digital keypad, a mouse, a trackball, a touch screen, a cursor movement key, or a combination thereof, to communicate information and commands with the processor 510.

Operations related to the testing method 600 are provided as follows. In operation 610, a netlist file indicating an internal circuit of a chip is received.

For example, as shown in FIG. 5, the I/O interface 530 may receive data D1 and store the data D1 in the memory 520. The data D1 may be the netlist file for describing the internal circuit of the chip. For example, the netlist file may be used for describing the scan chain circuitry 100 in FIG. 1 and other circuits in the chip. In some embodiments, the circuit designer can design the circuit by describing the scan chain circuitry 100, the flip-flop circuit 120, and the gated flip-flop circuit 200 in the netlist file. In some embodiments, the contents of the netlist file conform to a predetermined type of syntax, and this syntax can be recorded in a description format that can be recognized by the testing system 500. In some embodiments, the netlist file is a gate-level netlist file. In some embodiments, a predetermined type of the netlist file may be hardware description language (Verilog) or very high-speed hardware description language (VHDL). The above types of syntax are given for illustrative purposes, and the present disclosure is not limited thereto.

In operation S620, a place and route procedure is performed according to the netlist file to generate layout data D2.

For example, the memory 520 stores software of a design tool or a computer-aided design tool, and the processor 510 can execute the software, in order to perform an automatic place and route procedure according to the data D1. In this manner, the processor 510 can automatically place the circuit components correspondingly and the connections between them according to the circuit indicated by the netlist file corresponding to the data D1, so as to generate the layout data D2 correspondingly.

In operation S630, the flip-flop circuit 120 is replaced with the gated flip-flop circuit 200 according to the layout data D2.

In some embodiments, the processor 510 can determine whether the flip-flop circuit 120 can be replaced with the gated flip-flop circuit 200 according to the layout data D2 and at least one predetermined condition.

Figure 7:
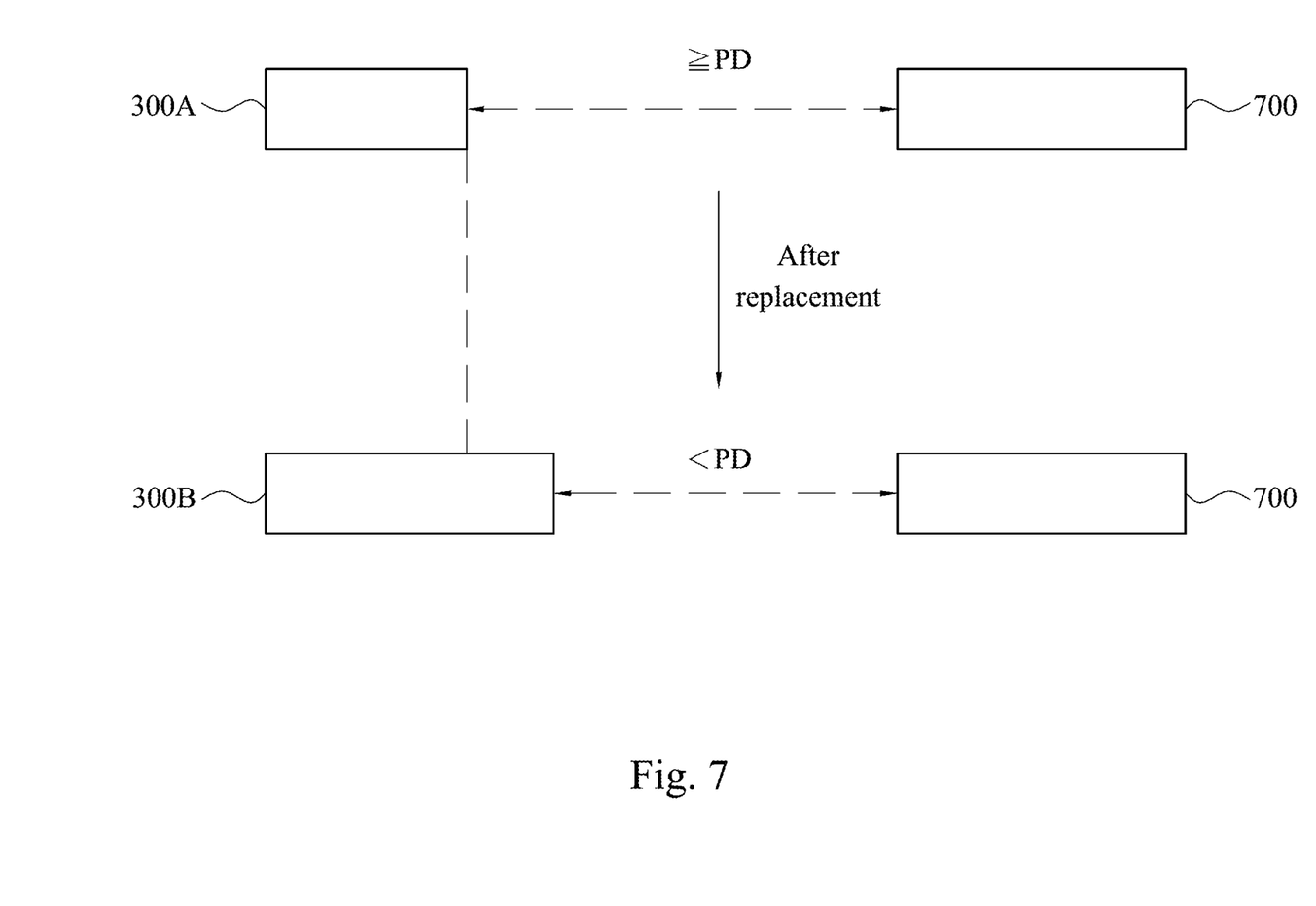
FIG. 7 is a schematic diagram illustrating a concept that a predetermined condition is a design rule check (DRC) according to some embodiments of the present disclosure.

Reference is now made to FIG. 7. FIG. 7 is a schematic diagram illustrating a concept that a predetermined condition is a design rule check (DRC), according to some embodiments of the present disclosure. Take FIG. 7 for example, the predetermined condition is to comply with a requirement of DRC. DRC is for ensuring that the circuit layout can be satisfied with the parameter requirements provided by the manufacturer, in order to improve the yield and stability of the chip. In practical applications, a plurality of circuit components are arranged in the layout of the chip, and the circuit components need to be spaced apart from each other by a specific distance, in order to meet the requirement of DRC. For example, as shown in FIG. 7, a pattern 700 is used to define a low threshold voltage component, and a distance between the pattern 700 and the circuit layout 300A of FIG. 3A is greater than a predetermined distance PD. Under this condition, the processor 510 can determine that the requirement of DRC is met. Then, if the circuit layout 300A of FIG. 3A is replaced with the circuit layout 300B (that is, the flip-flop circuit 120 is replaced with the gated flip-flop circuit 200), a distance between the pattern 700 and the circuit layout 300B will be smaller than the predetermined distance PD. Accordingly, the processor 510 determines that the requirement of DRC is not met, and thus determines not to replace the circuit layout 300A with the circuit layout 300B. On the contrary, if the distance between the pattern 700 and the circuit layout 300B is greater than or equal to the predetermined distance PD, the processor 510 determines that the requirement of DRC is met and thus determines to replace the circuit layout 300A with the circuit layout 300B.

Defining the low threshold voltage component is given in the above description for illustrative purposes, but the present disclosure is not limited thereto. In different embodiments, the processor 510 can determine whether all components meet the requirement of DRC according to the circuit layout, in order to complete operation S630.

Figure 8:
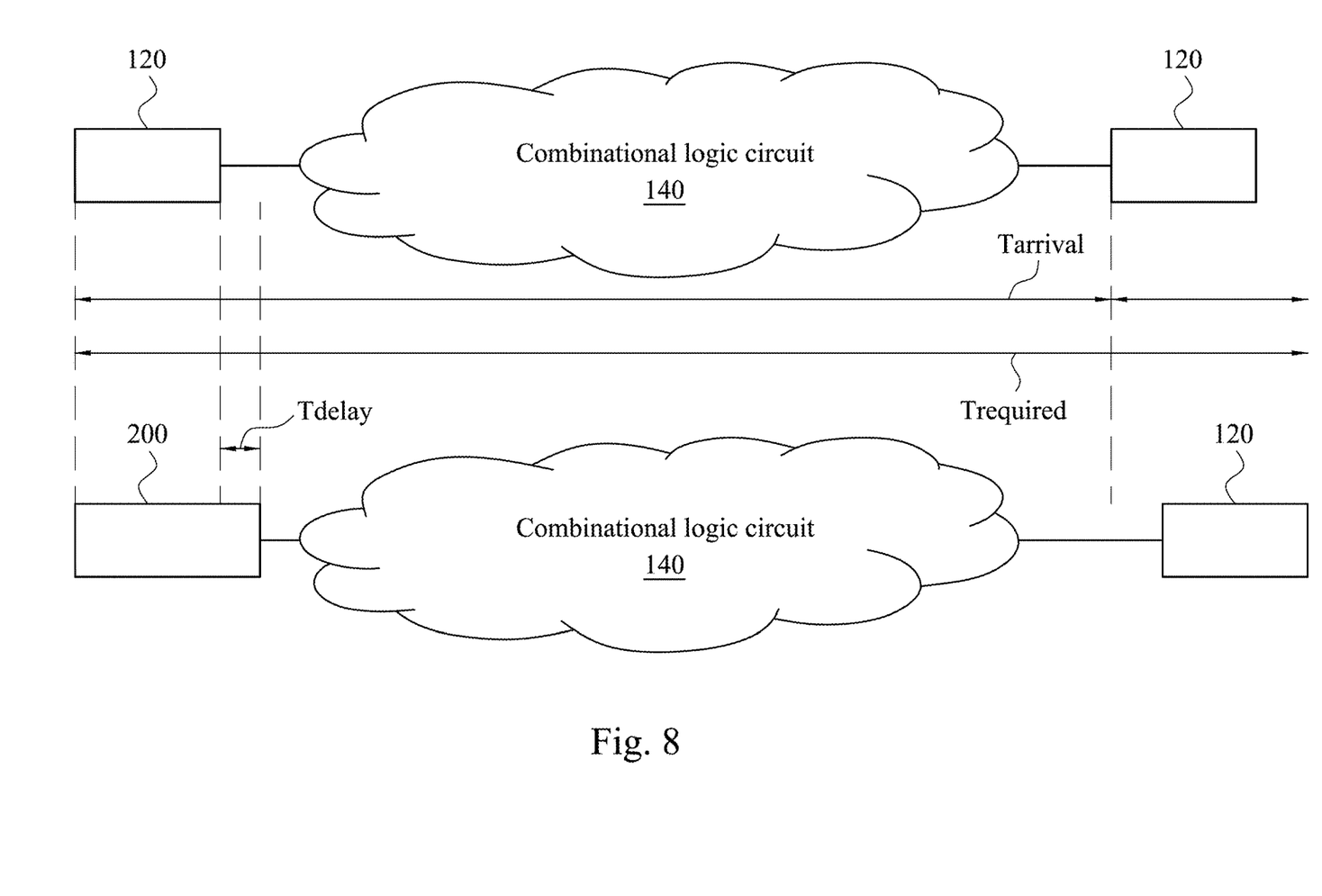
FIG. 8 is a schematic diagram illustrating a concept that a predetermined condition is a timing requirement according to some embodiments of the present disclosure.

Alternatively, reference is now made to FIG. 8. FIG. 8 is a schematic diagram illustrating a concept that a predetermined condition is a timing requirement according to some embodiments of the present disclosure. Take FIG. 8 for example, the predetermined condition is to comply with the timing requirement. In some embodiments, the processor 510 may first replace the circuit layout 300A with the circuit layout 300B, and execute a testing process, such as a static timing analysis (STA), etc., to determine whether the circuit layout 300B after replacement meets the timing requirement. For example, as shown in FIG. 8, after replacing the circuit layout 300A with the circuit layout 300B (that is, after replacing the flip-flop circuit 120 with the gated flip-flop circuit 200), the processor 510 can execute the STA to analyze a maximum delay time Tdelay caused by the gated flip-flop circuit 200 and a slack time Tslack of the scan chain circuitry 100. In some embodiments, the processor 510 can execute the STA to acquire a data arrival time Tarrival and a data preparation time Trequired of the scan chain circuitry 100, and obtain the slack time Tslack by calculating a difference between the above two times. If the slack time Tslack is greater than or equal to the delay time Tdelay, the processor 510 can determine that the timing requirement is met, and determine to replace the circuit layout 300A with the circuit layout 300B. Alternatively, if the slack time Tslack is smaller than the delay time Tdelay, the processor 510 can determine that the timing requirement is not met, and determine not to replace the circuit layout 300A with the circuit layout 300B.

With continued reference to FIG. 6, in operation S640, a new circuit layout is generated and a subsequent testing process is executed.

For example, after one or more flip-flop circuits 120 in the chip are replaced with the gated flip-flop circuits 200, the processor 510 can generate the new circuit layout as the data D3 and store it in the memory 520. Then, the processor 510 can perform the subsequent layout design and/or testing process according to the data D3, for example, including insertion of a decoupling capacitor, timing analysis, scan testing, etc. to determine whether the chip operates correctly.

In some related approaches, during chip testing, part or all of the flip-flop circuits in the netlist file are directly replaced with flip-flop circuits with a gated function, and followed by a process, such as an automatic place and route procedure, etc. Therefore, an overall area of the chip will be significantly increased.

As compared with the above approaches, in some embodiments, by disposing the flip-flop circuit 120 and the gated flip-flop circuit 200 that have compatible input and output interfaces, whether to replace the flip-flop circuit 120 with the gated flip-flop circuit 200 can be determined based on the predetermined condition (such as the requirement of DRC, timing analysis, etc.) after the automatic place and route procedure is performed (that is, after operation S620). In this manner, the flip-flop circuit 120 can be replaced with the gated flip-flop circuit 200 depending on remaining areas after the place and route procedure is performed, so that no additional area is needed. As a result, the original smaller chip area can be maintained, while the unnecessary power consumption caused by the combinational logic circuit 140 in the scan mode is reduced. In addition, according to some embodiments of the present disclosure, since whether to replace the flip-flop circuit 120 with the gated flip-flop circuit 200 is determined after the automatic place and route procedure is performed, the additional delay introduced by the actual wires and the additional circuits (for example, the gated circuit 124) can be considered together. Accordingly, a more accurate critical path can be obtained in the simulation at the post-layout stage.

As described above, the testing system, testing method, and gated flip-flop circuit provided in some embodiments of the present disclosure can exchange components at the design stage through compatible input and output interfaces. As a result, more chip area and unnecessary power consumption can be saved, and a more accurate timing analysis is obtained.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this invention provided they fall within the scope of the following claims and their equivalents.

The invention claimed is:

1. A testing system comprising:
   a memory configured to store a plurality of computer codes; and
   a processor configured to execute the plurality of computer codes to:
      perform a place and route procedure according to a netlist file corresponding to a chip, to generate first layout data;
      determine whether to replace a flip-flop circuit in the chip with a gated flip-flop circuit according to the first layout data, to generate second layout data; and
      run a test on a combinational logic circuit in the chip according to the second layout data, wherein a signal output from the gated flip-flop circuit is maintained at a fixed potential during the test to not change a switching of the combinational logic circuit.

2. The testing system of claim 1, wherein the processor is further configured to determine whether to replace the flip-flop circuit with the gated flip-flop circuit based on the first layout data and at least one predetermined condition.

3. The testing system of claim 2, wherein the at least one predetermined condition comprises a design rule check, and the processor determines to replace the flip-flop circuit with the gated flip-flop circuit if the gated flip-flop circuit meets the design rule check.

4. The testing system of claim 2, wherein the at least one predetermined condition comprises a timing requirement, and the processor determines to replace the flip-flop circuit with the gated flip-flop circuit if a delay time introduced by the gated flip-flop circuit meets the timing requirement.

5. The testing system of claim 1, wherein the processor is configured to replace a first circuit layout corresponding to the flip-flop circuit with a second circuit layout corresponding to the gated flip-flop circuit, and the flip-flop circuit and the gated flip-flop circuit have compatible input and output terminals in the first circuit layout or the second circuit layout.

6. A testing method comprising:
   performing a place and route procedure according to a netlist file corresponding to a chip to generate first layout data;
   determining whether to replace a flip-flop circuit in the chip with a gated flip-flop circuit according to the first layout data to generate second layout data; and
   running a test on a combinational logic circuit in the chip according to the second layout data, wherein a signal output from the gated flip-flop circuit is maintained at a fixed potential during the test to not change a switching of the combinational logic circuit.

7. The testing method of claim 6, wherein the generating the second layout data comprises:
   determining whether to replace the flip-flop circuit with the gated flip-flop circuit based on the first layout data and at least one predetermined condition.

8. The testing method of claim 7, wherein the at least one predetermined condition comprises a design rule check, and the flip-flop circuit is determined to be replaced with the gated flip-flop circuit if the gated flip-flop circuit meets the design rule check.

9. The testing method of claim 7, wherein the at least one predetermined condition comprises a timing requirement, and the flip-flop circuit is determined to be replaced with the gated flip-flop circuit if a delay time introduced by the gated flip-flop circuit meets the timing requirement.

10. The testing method of claim 6, wherein the generating the second layout data comprises:
   replacing a first circuit layout corresponding to the flip-flop circuit with a second circuit layout corresponding to the gated flip-flop circuit, in order to generate the second layout data,
   wherein the flip-flop circuit and the gated flip-flop circuit have compatible input and output terminals in the first circuit layout or the second circuit layout.

* * * * *